March 9, 1948. J. G. VEATCH 2,437,309
TOROIDAL WINDING MACHINE
Filed May 22, 1944 11 Sheets-Sheet 5

Inventor
Joseph G. Veatch
Attorney

March 9, 1948.  J. G. VEATCH  2,437,309
TOROIDAL WINDING MACHINE
Filed May 22, 1944  11 Sheets-Sheet 6

Inventor
Joseph G. Veatch

March 9, 1948. J. G. VEATCH 2,437,309
TOROIDAL WINDING MACHINE
Filed May 22, 1944 11 Sheets-Sheet 7

Inventor
Joseph G. Veatch
By Ira Shelton Jones
Attorney

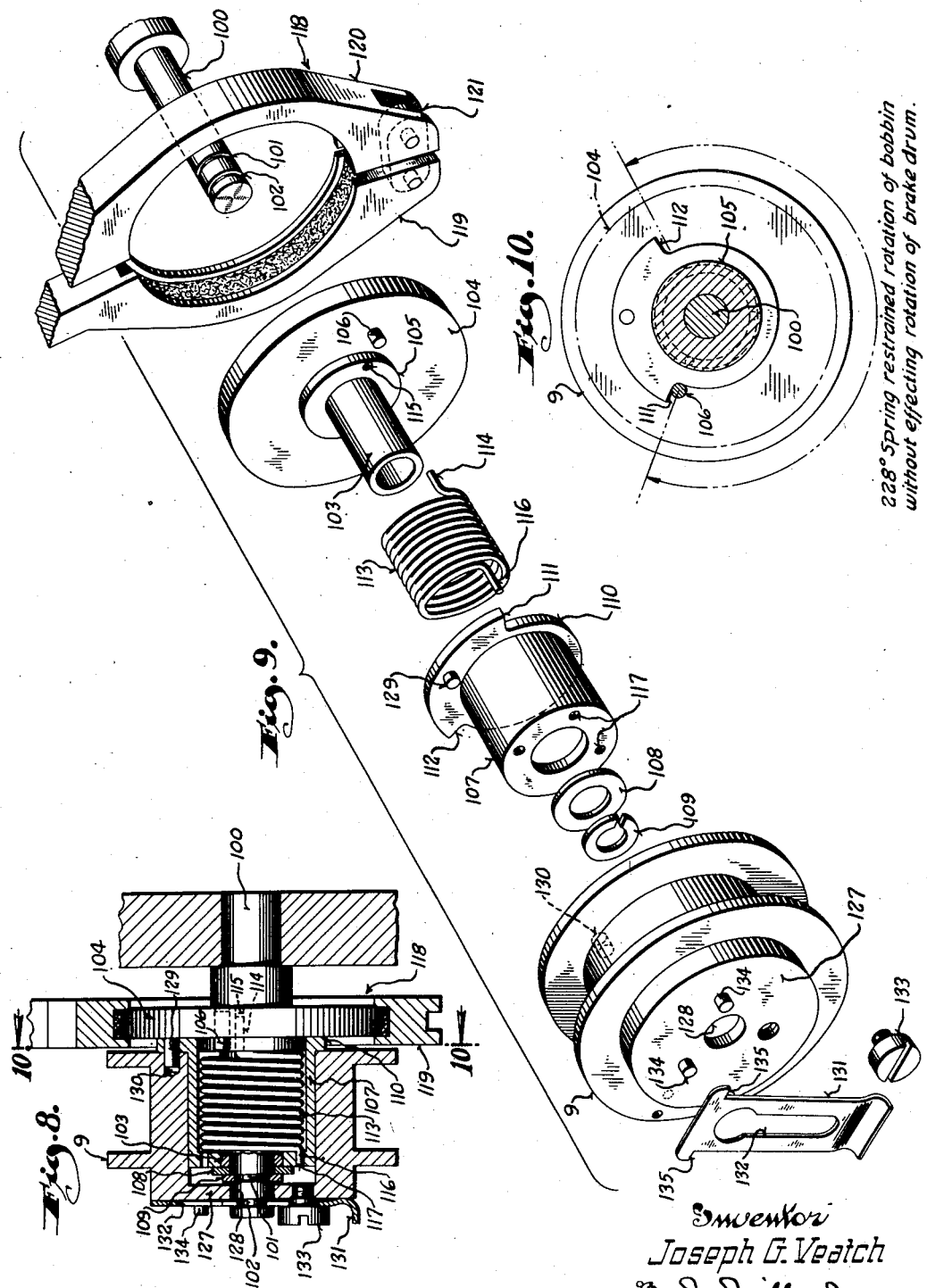

March 9, 1948. J. G. VEATCH 2,437,309
TOROIDAL WINDING MACHINE
Filed May 22, 1944 11 Sheets-Sheet 9
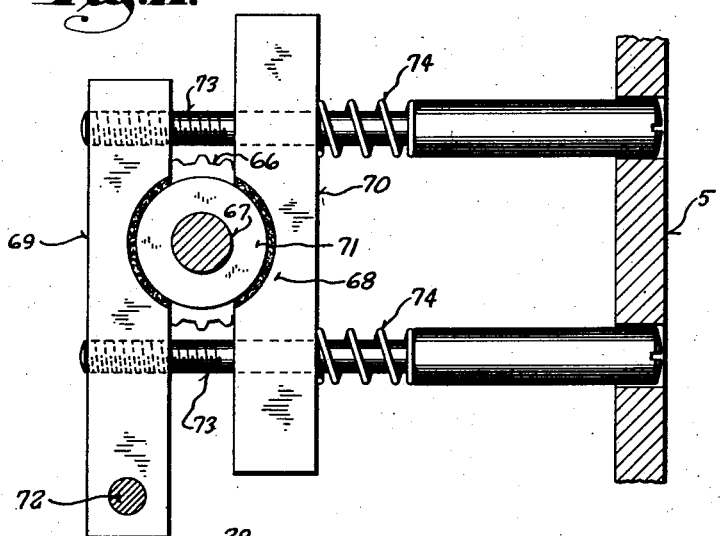
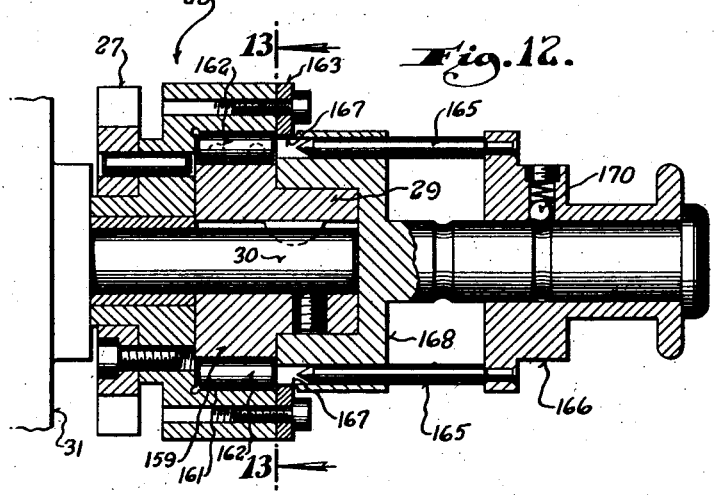
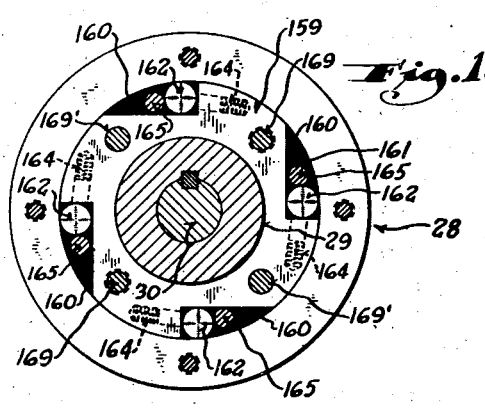
Inventor
Joseph G. Veatch
By
Attorney March 9, 1948.   J. G. VEATCH   2,437,309
TOROIDAL WINDING MACHINE
Filed May 22, 1944   11 Sheets-Sheet 10
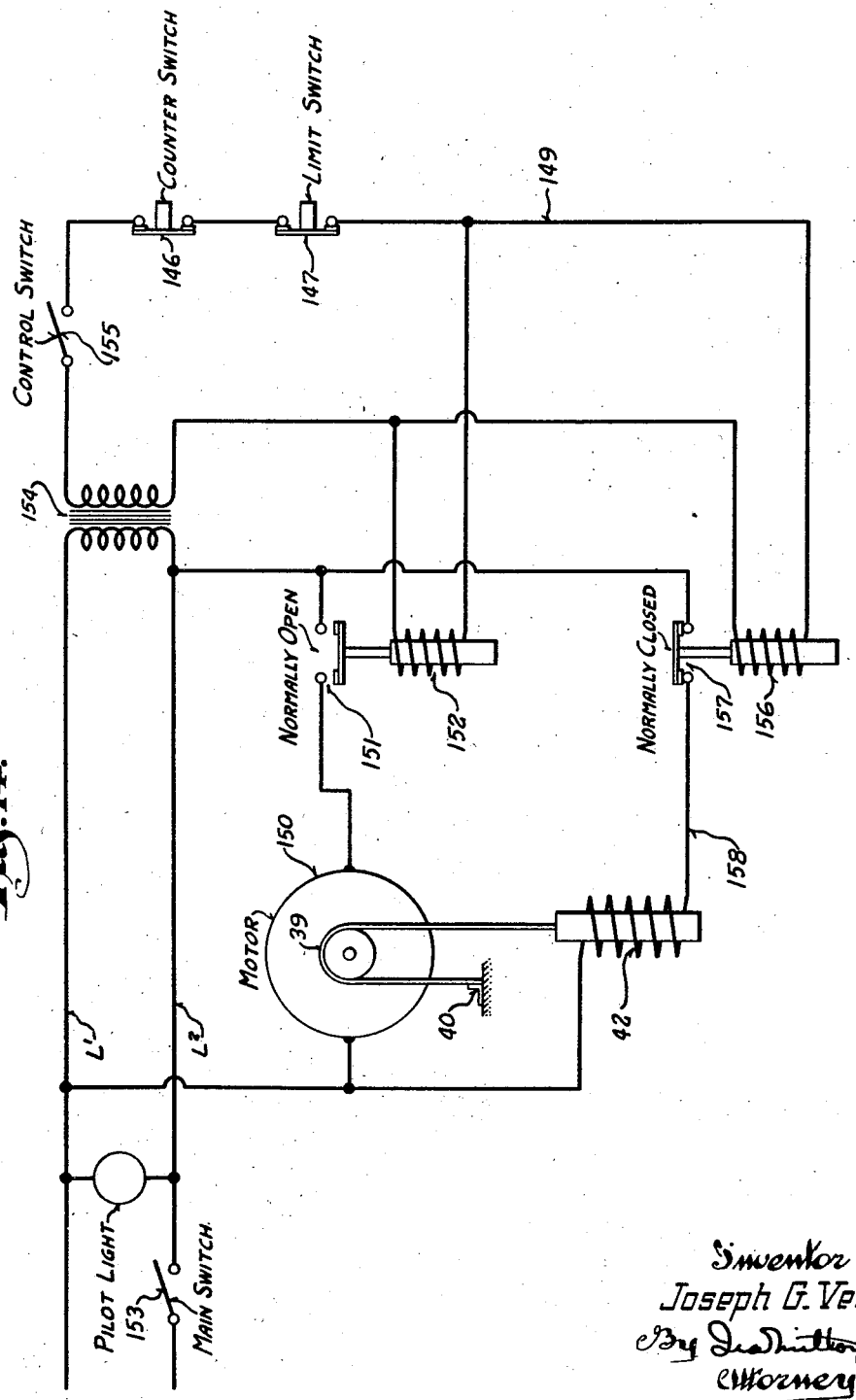

Inventor
Joseph G. Veatch

Patented Mar. 9, 1948

2,437,309

UNITED STATES PATENT OFFICE 2,437,309

TOROIDAL WINDING MACHINE

Joseph G. Veatch, Elkhart, Ind., assignor to Chicago Telephone Supply Company, Elkhart, Ind., a corporation of Indiana Application May 22, 1944, Serial No. 536,715

21 Claims. (Cl. 242—4)

This invention relates to winding machines and refers particularly to so-called toroidal winding machines designed to wind wire, thread and other strand material onto annular cores. Hereinafter the term "strand material" will be used to designate wire, thread or any other material suitable to be wound into coils; and where the term "annular" core is used it is intended to cover any part of an annulus or arc as well as a complete ring.

Toroidal winding machines generally have a support for the core adapted to rotate the same as the strand material is wound thereon and employ some means for revolving a bobbin in an orbit intersecting the annular core and encircling a segment thereof. Thus, for each traversal of its orbit the bobbin applies one coil onto the annular core, and to insure the desired distribution of the strand material on the core the core support rotates at a predetermined speed ratio to the revolution of the bobbin.

It has always been a problem in winding machines of this type to maintain adequate tension on the strand material being wound, particularly where conditions are such that the annular core cannot be located at the center of the orbit traveled by the bobbin. Moreover, the cross-sectional shape of the core on which the strand material is wound seldom has all points of its boundary equidistant from a central point, so that even if it were possible to have the core segment circumscribed by the orbit of the bobbin at all times exactly at the center of the orbit the length of the strand material from the bobbin to the point of its application onto the core increases and decreases as the bobbin travels along its orbit. This condition is, of course, further aggravated where the machine is designed to handle cores of different diameters and different cross-sectional dimensions.

It is therefore an object of this invention to provide a new and improved manner of maintaining tension on the strand material, which is so designed that regardless of varying sizes of the core both as to diameter and cross-section, adequate winding tension is always maintained on the strand material.

There have been various schemes employed in the past to maintain tension on the strand material, but in all known expedients for this purpose the tensioning means has been an adjunct acting upon the strand material between the bobbin and its point of application onto the core.

With a view towards improving the operation of the machine, it is another object of this invention to incorporate the tensioning means directly in the bobbin assembly, i. e., the mechanism for mounting and carrying the bobbin along its orbit.

In this connection it is a further object of this invention to provide means whereby the unwinding rotation of the bobbin is adequately retarded to provide the desired tension on the strand material and wherein a spring acting on the bobbin and loaded by tension on the strand material effects retrieving rotation of the bobbin whenever the length of the strand material from the bobbin to its point of application onto the core is decreasing.

Another object of this invention dealing with the maintenance of adequate tension on the strand material lies in the provision of a novel manner of associating brake mechanism to retard unwinding rotation of the bobbin with spring means for imparting retrieving rotation thereto.

Another object of this invention is to provide a convenient manner of readily detachably securing the bobbin in position on its holder.

Another object of this invention is to provide a simple, but effective, clamping arrangement for supporting the core in a manner permitting 360° of rotation of the core.

In this connection it is more specifically an object of this invention to provide a turret on which the clamp for the core is mounted and which incorporates a simple latch for quickly releasably securing the same to its drive member in either of two diametrically opposite positions so that half an annular core may be wound with the clamp gripping the core at one point while the remainder thereof is wound with the clamp moved to another position on the core.

One of the specific functions of this invention is to provide a machine for quickly and efficiently winding strand material on annular cores having different heights arranged in stepped relation. To this end, it is an object of this invention to provide means for instantaneously stopping the machine and quickly declutching the same from its power source to permit manual manipulation thereof during the transition from one stage or step on the core to another.

Another object of this invention is to provide means for automatically stopping the machine after a predetermined amount of strand material has been applied to the core.

Still another object of this invention is to provide a machine of the character described wherein the bobbin mechanism and the core indexing mechanism are positively mechanically driven from a common power source to insure optimum conditions of accuracy in the spacing of the strand material on the core.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention, constructed in accordance with the best mode so far devised for the practical application of the principles thereof, and in which:

Figure 8 is a longitudinal sectional view through the bobbin assembly;

Figure 9 is a perspective view of the elements of the bobbin assembly shown separated and in their proper order of assembly;

Figure 10 is a cross-sectional view taken through Figure 8 on the plane of the line 10—10 and showing particularly the lost motion driving connection between the bobbin holder and the brake shaft on which it is mounted;

Figure 11 is a sectional detail view taken through Figure 3 on the plane of the line 11—11;

Figure 12 is a longitudinal sectional view through the silent ratchet clutch which controls the transmission of power to the machine, the parts being shown with the clutch engaged;

Figure 13 is a cross-sectional view taken through Figure 12 on the plane of the line 13—13, but showing the clutch disengaged;

Figure 14 is a wiring diagram of the electrical connections of the machine; and

Figure 1:
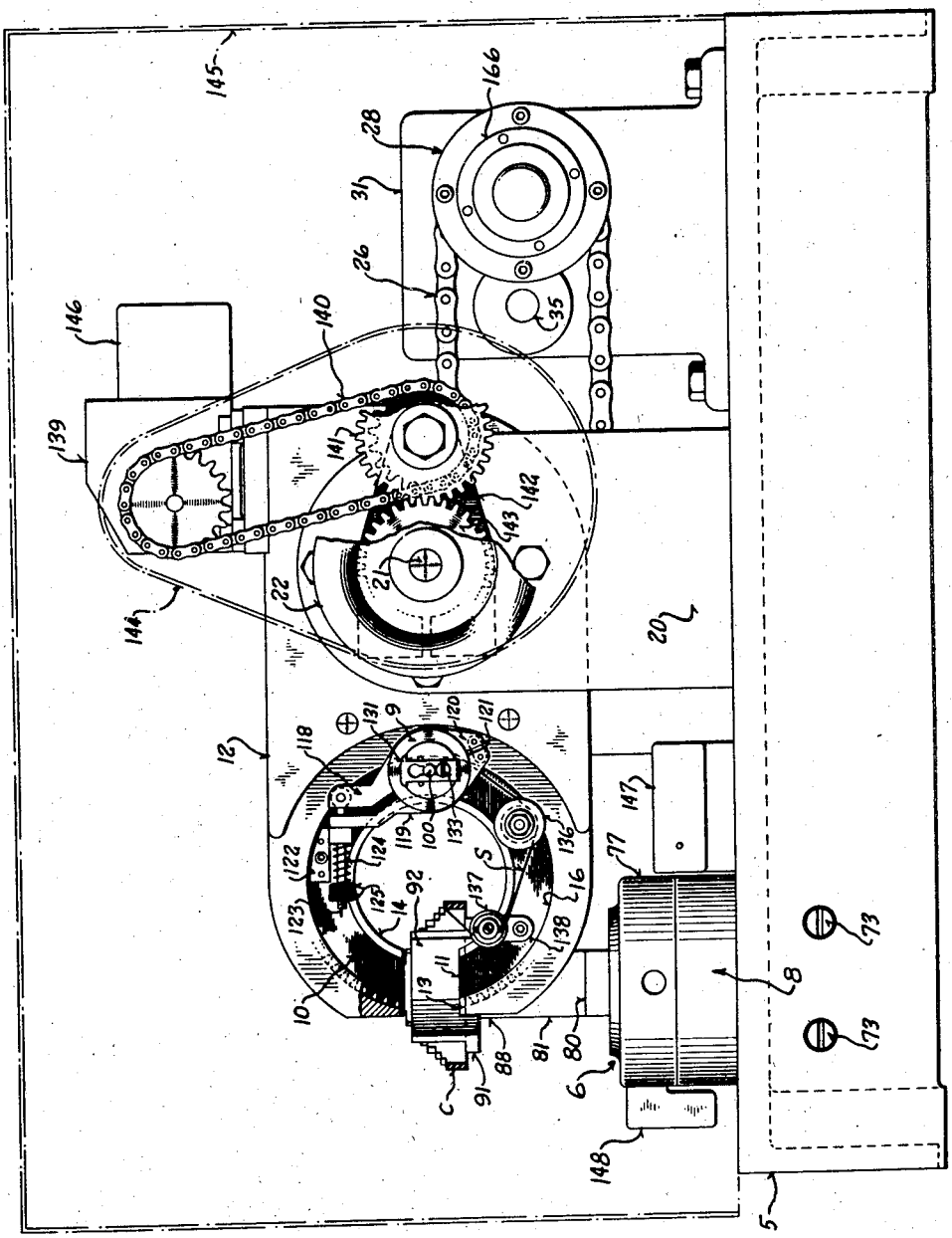
Figure 1 is a front view of a toroidal winding machine embodying this invention, parts thereof being broken away and in section.
Figure 2:
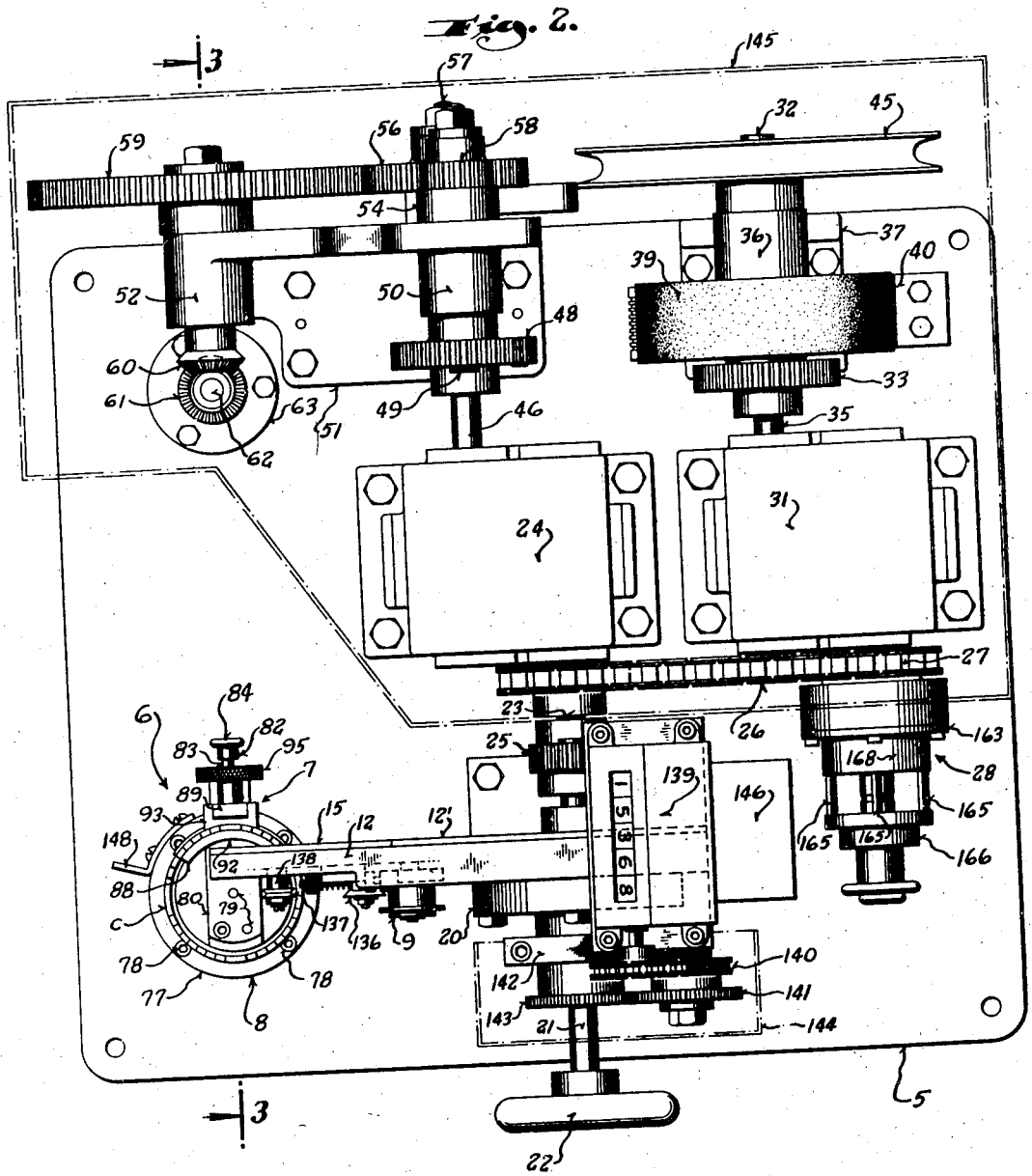
Figure 2 is a top plan view of the machine.

Referring now particularly to the accompanying drawings, in which like numerals indicate like parts, the numeral 5 designates a base upon which the mechanism of the machine is mounted and which in turn may be secured to a bench or other suitable support at a convenient working height.

Mounted on this base at the front thereof is a core supporting assembly indicated generally by the numeral 6. This core supporting assembly comprises a clamp 7 mounted on an indexing head 8 and adapted to support an annular core C by clamping a segment thereof between its jaws. The core C is thus supported in a horizontal position, and the parts are so proportioned that the center of the core lies on the axis of the indexing head.

A power drive, to be hereinafter described, rotates the indexing head and consequently the core as the winding of the strand material S onto the core proceeds. A supply of the strand material is carried by a bobbin 9 which is mounted on a shuttle 10 to be carried thereby along a circular orbit interlinked with the core and embracing a segment thereof.

For each cycle of revolution of the bobbin, one coil of strand material is applied to the core. The ratio of the speed of rotation of the indexing head to the speed of the bobbin thus determines the spacing between the coils of strand material applied onto the core. To enable interlinking the shuttle with the core C the shuttle has a gap 11 sufficiently wide to permit the core to be passed therethrough when the shuttle is so positioned in its housing 12 that its gap aligns with a gap 13 in the housing. The housing is supported above the base by a bracket 20.

The shuttle has gear teeth around its outer periphery and hence may be considered a gear segment. It is journaled on a bearing 14 formed on a cover plate 15 which coacts with a flange 16 on the housing 12 to confine the shuttle against lateral motion, the cover plate 15, like the housing and the shuttle, having a gap 17 to permit the passage of the core therethrough.

The shuttle is driven by a gear 18 mounted in the housing 12 rearwardly of the shuttle gear segment and connected thereto through two intermediate gears 19 also journaled in the housing 12.

The gears 18 and 19 are held in the housing 12 by a cover plate 12', which is preferably separate from the cover plate 15 so that if the shuttle assembly must be removed it can be done without disturbing the gears 18 and 19.

Figure 5:
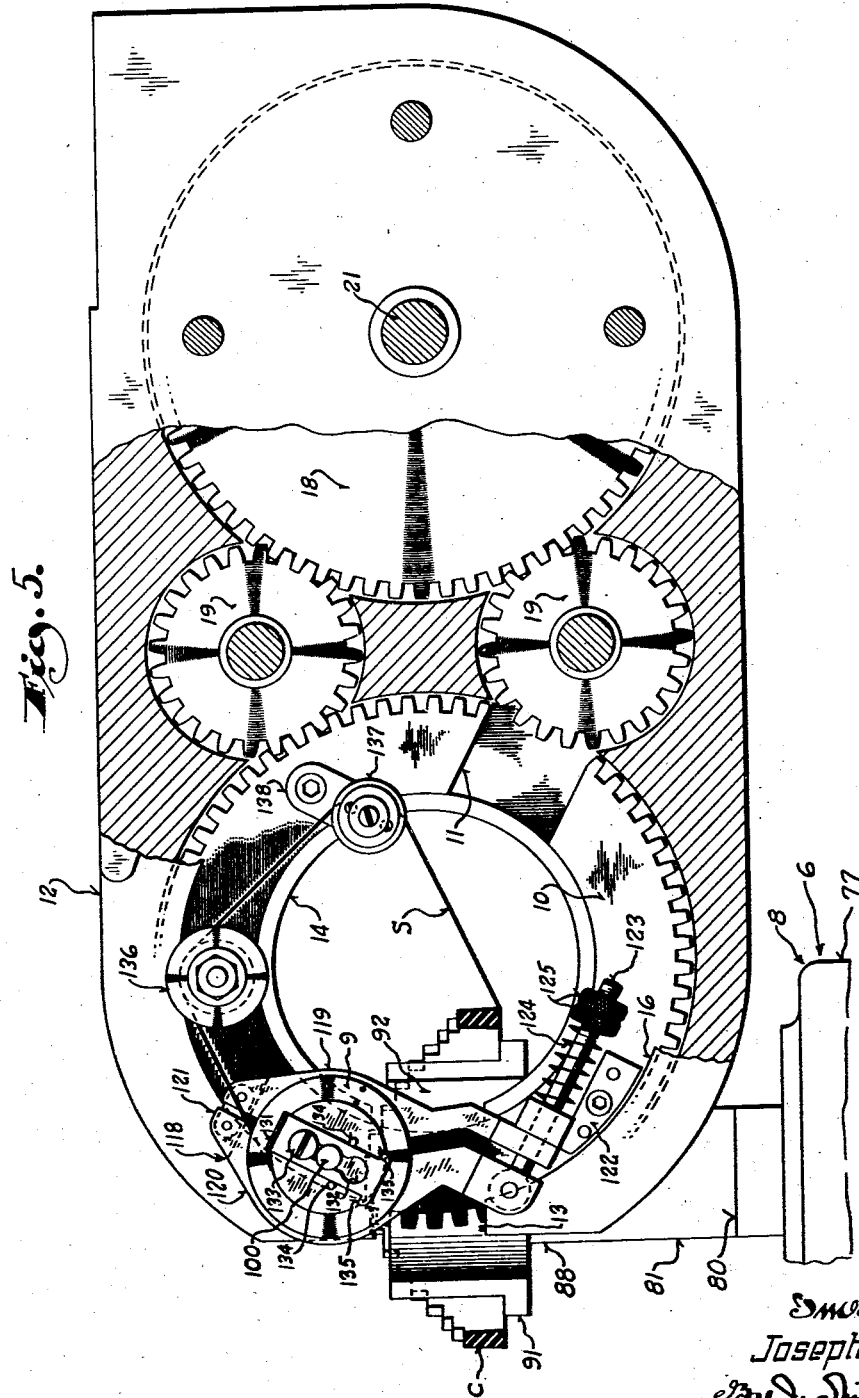
Figure 5 is an enlarged detail view of the bobbin and the shuttle assembly carrying the bobbin, and showing the core in position having strand material wound thereon, parts of said view being broken away and in section.

As particularly shown in Figure 5, provision of the two intermediate gears provides power transmission to the shuttle gear segment notwithstanding its gap 11.

A shaft 21 fixed to the gear 18 projects from both sides of the housing 12 and at one end this shaft mounts a hand wheel 22 by which manual rotation may be imparted to the gears 18 and 19 to drive the shuttle. The opposite end of the shaft 21 is drivingly connected with the input shaft 23 of a speed reducer 24 through gears 25 and 25', the former fixed on shaft 21 and the latter fixed to the shaft 23.

Power is transmitted to the input shaft 23 by a transmission chain 26 driven by a sprocket 27 carried by the driven element of a silent ratchet clutch indicated generally by the numeral 28. The driving element 29 of this clutch is fixed to the output shaft 30 of a speed reducer 31, which, in turn, is driven from a power shaft 32 through meshing gears 33 and 34, the former fixed on the power shaft and the latter on the input shaft 35 of the speed reducer 31.

The power shaft 32 is journaled in a bearing 36 carried in a bracket 37 extending up from the base plate and has a brake drum 38 mounted thereon with which a brake band 39 cooperates to instantaneously stop the machine upon opening of any one of a number of switches controlling its operation. One end of the brake band is fixed to the base as at 40. Its other end has a link 41 fixed thereto and projecting down through the base 5 to be connected to a solenoid 42. Between the base 5 and a shoulder 43 the link 41 has a compression spring 44 mounted thereon to yieldingly hold the plunger of the solenoid up and the brake in its released position. Obviously, upon energization of the solenoid the brake band is pulled tight against the action of the spring 44.

The power shaft 32 also has a grooved pulley 45 fixed thereon over which a V-belt (not shown) is trained to transmit power either from a motor driven jack shaft or directly from a motor shaft, neither of which, however, is shown. In practice, it is convenient to place the motor and the jack shaft, if one is used, under the table or bench upon which the machine is mounted.

From the description thus far, it will be seen that power is transmitted from the power shaft 32 through gear reduction 31, the silent ratchet clutch 28, if the same is engaged, to the input shaft 21 upon which gear 18 is fixed which in turn carries the drive through intermediate gears 19 to the shuttle 10.

It will also be evident that if the clutch 28 is disengaged the shuttle, as well as the input to the gear reducer 24, may be manually driven.

Figure 4:
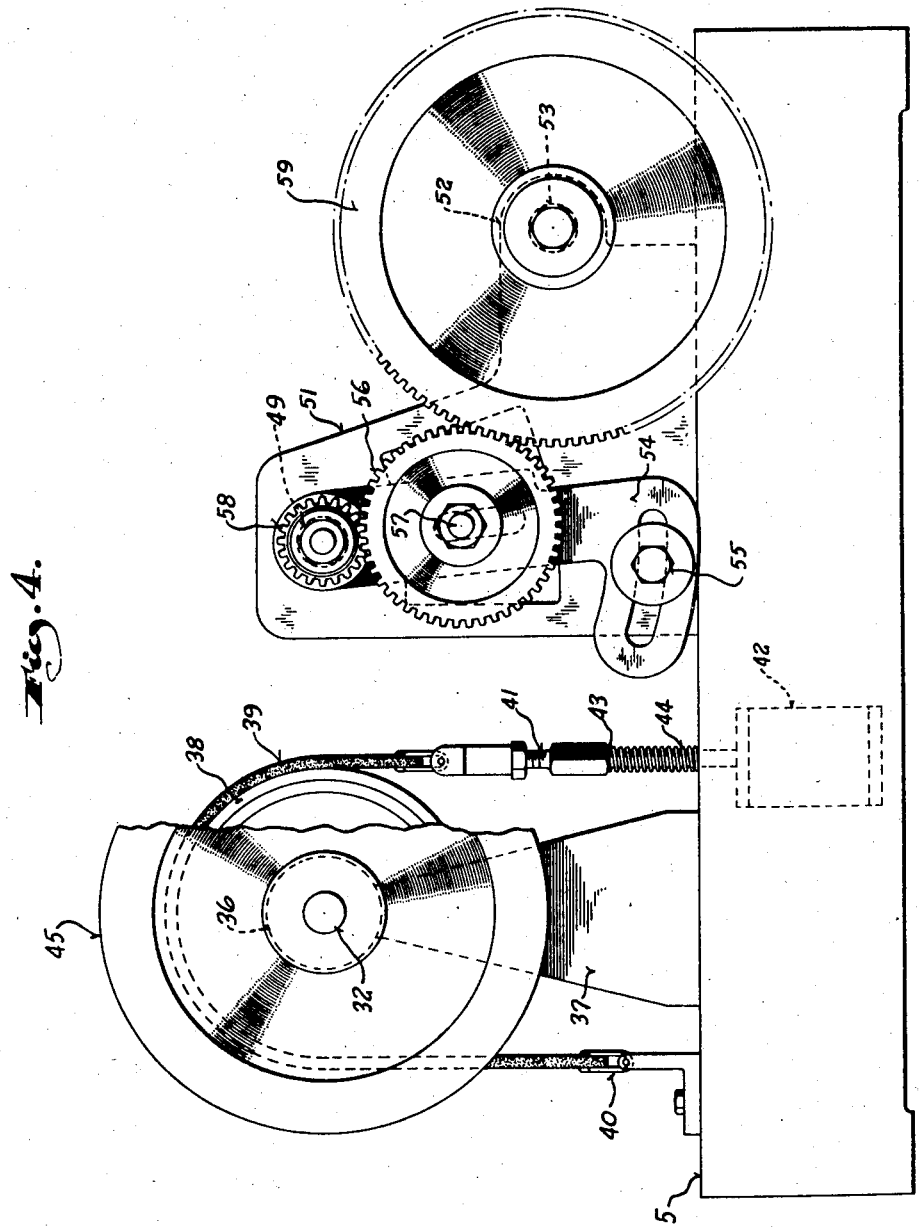
Figure 4 is a rear view of Figure 2 to show the brake for instantaneously stopping the machine and the gear change mechanism by which the speed ratio between the velocity of the bobbin and the indexing of the core are determined.

The output shaft 46 of the speed reducer 24 is drivingly connected through gears 47 and 48 with a shaft 49 journaled in a bearing 50. The bearing 50 is part of a bracket 51 extending up from the base 5 and which also embodies a bearing 52 for a bevel gear shaft 53. As best shown in Figure 4 a quadrant 54 depends from the shaft 49 to be swingingly adjustable across the rear face of the bracket 51 to which it may be locked in any adjusted position by a clamping screw 55.

The quadrant 54 carries an idler gear 56 journaled on a stub shaft 57 adjustable along the quadrant. This idler gear meshes with a pinion 58 fixed on the shaft 49 and with a gear 59 fixed on the bevel gear shaft 53. Through proper selection of pinion 58, gear 59, and idler 56, the speed ratio between the shuttle drive and the bevel gear shaft 53 may be varied to obtain different spacings of the strand material on the core inasmuch as the bevel gear shaft 53 is positively drivingly connected with the indexing head controlling rotation of the core.

Figure 3:
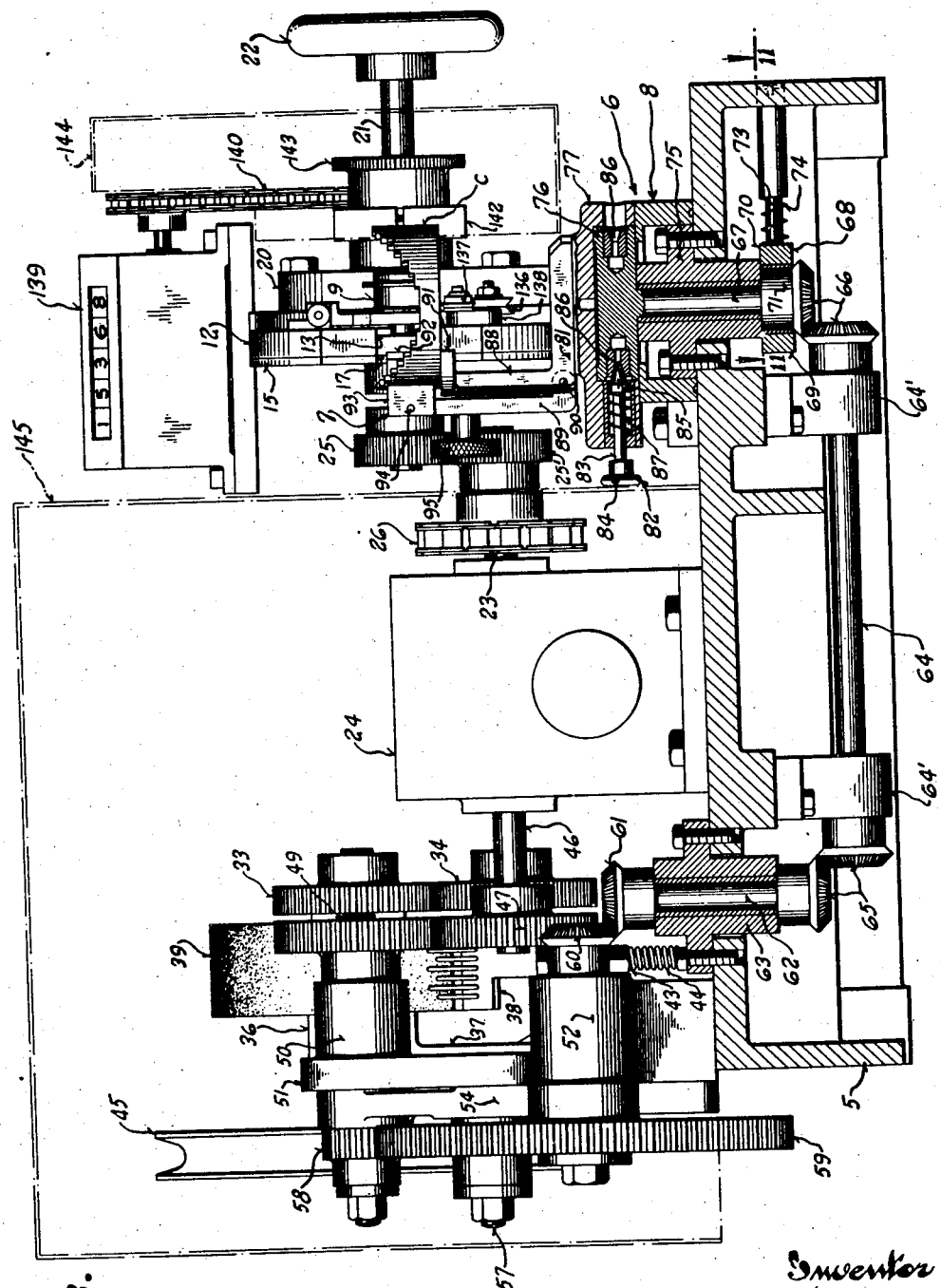
Figure 3 is a cross-sectional view taken through Figure 2 on the plane of the line 3—3.

The manner in which the bevel gear shaft 53 is drivingly connected to the indexing head is clearly shown in Figure 3. A bevel gear 60 on the shaft 53 meshes with a bevel gear 61 on a vertical shaft 62 journaled in a bearing 63 which extends down through a hole in the base 5. The lower end of the shaft 62 is drivingly connected with a horizontal shaft 64 through bevel gears 65 and the horizontal shaft 64 which is journaled in bearings 64' under the base is drivingly connected through bevel gears 66 with the central stem or shaft 67 of the indexing head.

A brake 68, best shown in Figure 11, takes out all rotation vibration and what slight backlash there may be to insure optimum conditions of accuracy for the placement of the strand material on the core. The brake comprises two complementary brake shoes 69 and 70 spring urged into engagement with the hub 71 of the bevel gear fixed to the shaft or stem 67. The brake shoe 69 is pivoted on a fixed stud 72 depending from the bottom of the base and the brake shoe 70 is held assembled with the shoe 69 by screws 73 threaded into the shoe 69. Spring tension is supplied by compression springs 74 mounted on the screws 73 and, as will be readily apparent, the brake action is adjustable by turning the screws 73 in or out.

Figure 6:
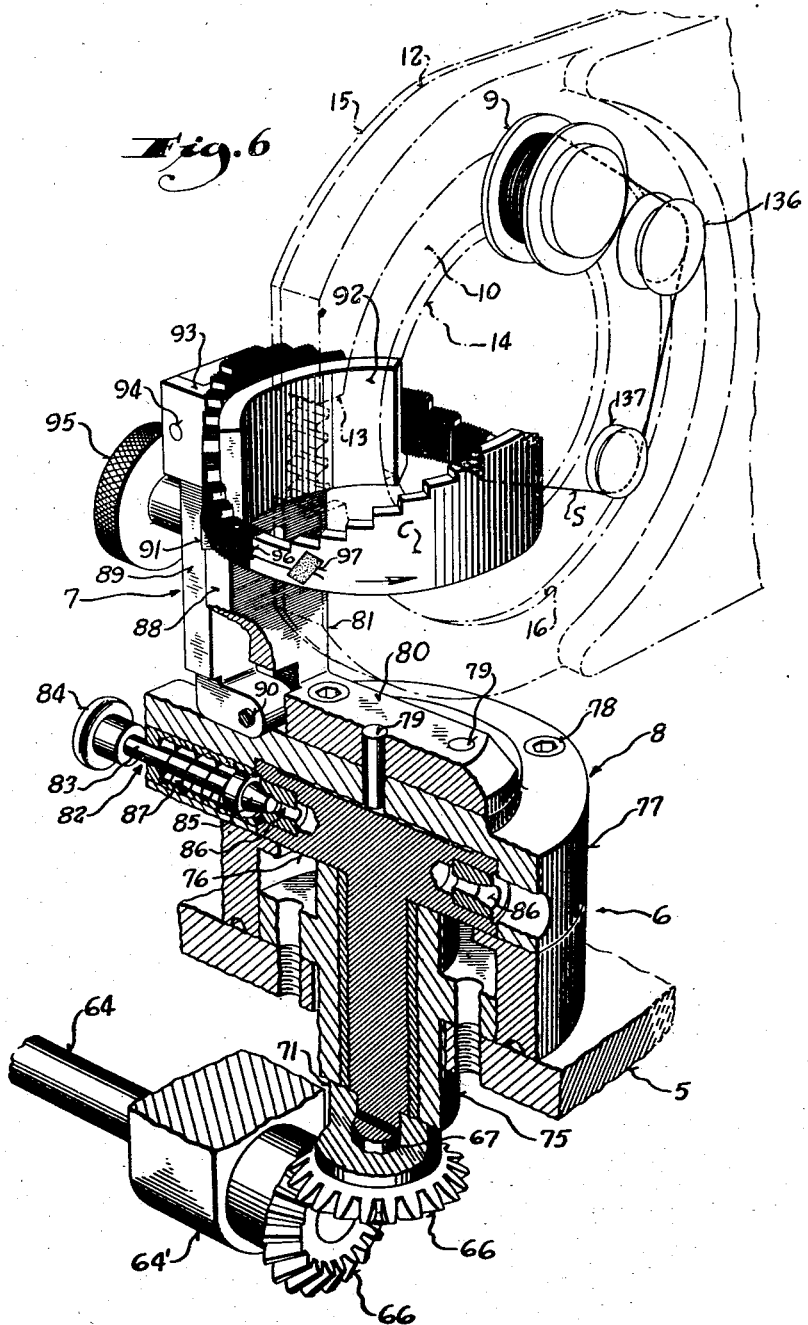
Figure 6 is a perspective view of the core clamp and indexing mechanism showing its relationship to the shuttle-bobbin assembly, said view being partially in section.
Figure 7:
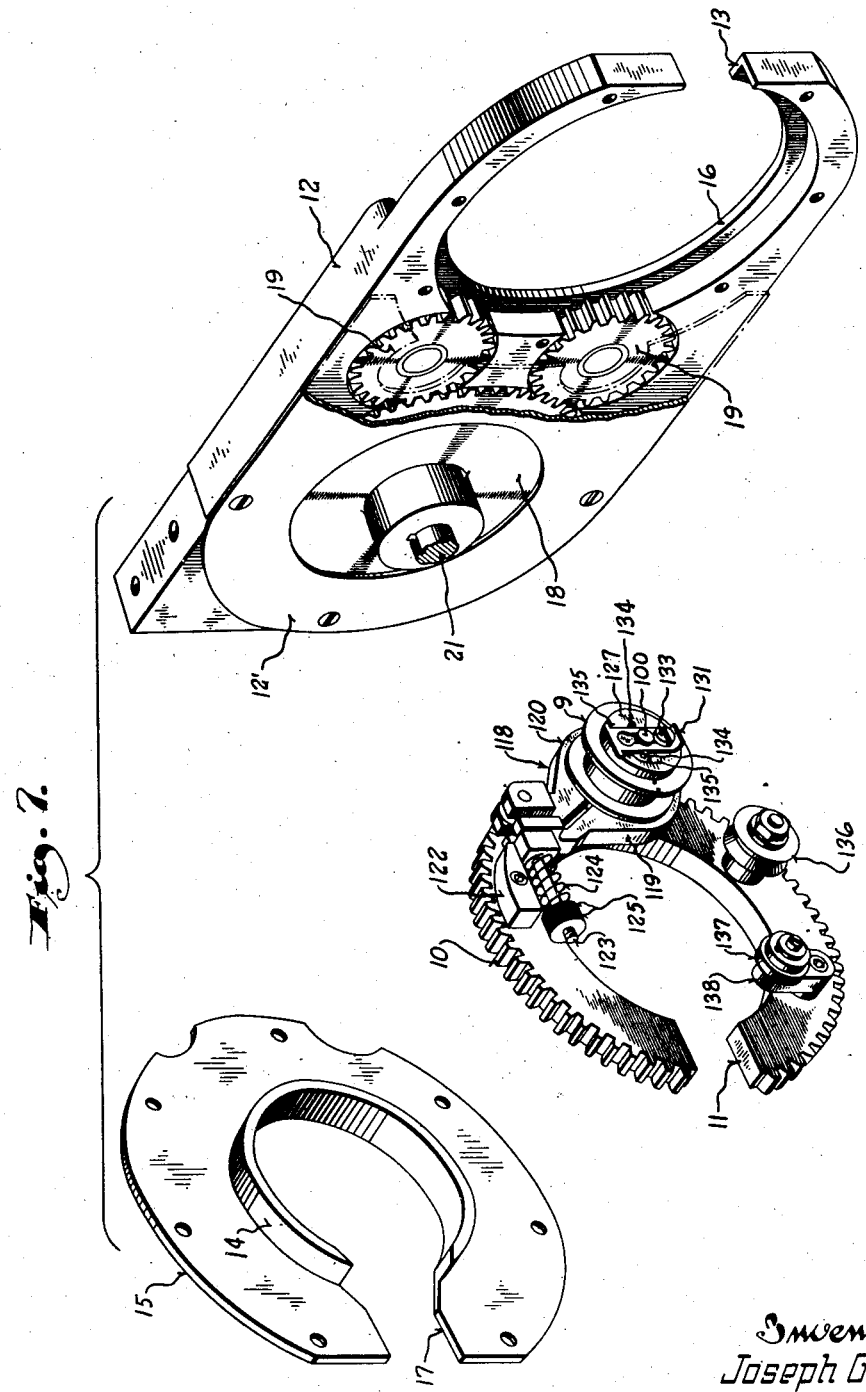
Figure 7 is a perspective view of the various elements of the shuttle-bobbin assembly with the parts thereof separated.

The indexing head indicated generally by the numeral 8, and perhaps best illustrated in Figure 6, comprises a bearing 75 mounted on the base 5 and projecting through a hole therein to rotatably support the shaft or stem 67 in a vertical position. The upper end of the shaft or stem 67 has an enlarged flange 76 thereon which is snugly received within a turntable 77. The turntable 77 comprises upper and lower sections connected by screws 78 to enable assembly of the turntable with the flange 76. The parts are so fitted that the bottom of the turntable, which may be equipped with an oil groove supplied with lubricant in any suitable manner, rests on the top of the base while the flange 76 is received between the upper and lower sections of the turntable without binding.

The clamp 7 which grips and holds the core C is mounted on the turntable, being properly located thereon by dowel pins 79 projecting from the top of the turntable and received in the foot 80 of a bracket 81 which supports the clamp 7.

For cores of different diameters there are different clamping brackets and for each size the mounting of the bracket on the turntable is such that the center of the core is exactly coaxial with the turntable. The turntable may be locked to the flange 76 in either of two diametrically opposite positions by a latch 82. The latch 82 comprises a plunger 83 having a knob 84 on its outer end and a tapered point 85 on its inner end. The point 85 is adapted to snap into one or the other of two diametrically opposite sockets 86 in the flange 76, a spring 87 yieldingly urging the plunger inwardly to effect this action.

The clamp 7 comprises two complementary clamping jaws 88 and 89, the former being an integral fixed part of the bracket 81, and the latter being pivoted to the bracket as at 90. The fixed jaw 88 has a shoulder or ledge 91 on which the bottom of the core rests and an arcuately curved portion 92 shaped to engage the inner cylindrical surface of the core.

The movable jaw 89 has a compensating pad 93 pivoted thereto as at 94. This compensating pad is shaped to conform to the outer surface of the core C and engages firmly thereagainst notwithstanding the fact that the movable jaw 89 is constrained to radial movement about the pivot 90. A clamping nut 95, threaded on a screw fixed to the stationary jaw 88, provides means for drawing the clamping jaws together.

As the winding proceeds the indexing head, and consequently the core C, is rotated in a counter-clockwise direction. When the empty core is first clamped in place the end of the strand material, if it is fine wire or the like, is made fast thereto by being laced through holes 96 and secured to the side of the core by a small piece of adhesive tape 97 or the like. For heavier wire it is not necessary to lace the wire through the holes. In this case the operator merely manually applies two or three turns onto the core and secures the end by adhesive tape.

Where the core has a stepped height, as shown in the drawings, the start of the winding is at the middle of one of its two opposite lowest steps. Figure 6 shows one-half of the core wound with strand material from the middle of one of the lowest steps to the middle of the other lowest step, and with the machine set to continue the winding. Consequently, it is the wound half of the core which is shown gripped between the jaws of the clamp 7.

In instances where the wire is heavy enough to enable the starting end to be fastened without requiring the same to be laced through the holes 96, the operator stops the machine in time to undo the first few manually applied turns which are then rewrapped around the wound portion and secured by adhesive tape to thus enable machine winding for the full 360 degrees.

For the sake of clarity Figure 6 is the only view showing strand material on the core.

At the start of the winding operation that portion of the core shown in Figure 6 without strand material thereon was gripped between the jaws of the clamp and the first half of the core had strand material wound thereon. The machine was then stopped, the clamp released and while the operator held the core against movement the latch 82 was disengaged and the turntable swung around 180° to the position in which it is illustrated in Figure 6. In this position the latch was again engaged and the clamp tightened to continue the winding operation.

Inasmuch as the curved surface of the stationary clamp portion 92 engaged with the inner face of the core positions the core with relation to the axis of the turntable, a shim (not shown) must be inserted between this curved surface and the inner face of the core whenever the weight or diameter of the strand material exceeds anything but the finest wire. The thickness of this shim is equal to the diameter of the strand material so that the position of the core is the same when the unwound core is gripped in the clamp as it is when the wound portion of the core is gripped.

The bobbin assembly and the manner in which it is mounted on the shuttle are best illustrated in Figures 7 to 10, inclusive. As here shown, the shuttle has a stub shaft 100 fixed thereto and projecting from one face thereof. The outer end of the stub shaft has two annular grooves 101 and 102. Freely rotatable on the stub shaft is a hollow brake shaft 103, the inner end of which has a flange 104. A circular centrally located boss or hub 105 and a driving pin 106 project from the face of this flange.

A substantially cup-shaped bobbin holder 107 is journaled on the hollow brake shaft 103 with its open end receiving bearing support from the boss or hub 105 and its closed end receiving bearing support directly from the shaft 103. A washer 108 and locking ring 109 engaged in the annular groove 101 of the stub shaft secures the bobbin holder in position on the brake shaft.

The open end of the bobbin holder, which lies flush against the adjacent face of the flange 104, has a flange 110 thereon, a segment of which is cut away to define two substantially radial abutments 111 and 112. These abutments coact with the stop pin 106 to provide a lost motion driving connection between the brake shaft and the bobbin holder.

The lost motion in this connection is normally taken up by a torsion spring 113 encircling the hollow brake shaft inside the cup-shaped bobbin holder. One end 114 of the spring is fixed to the brake shaft by projecting into a hole 115 in the boss or hub 105 and its other end 116 is connected to the bobbin holder by being inserted into one of a number of holes 117 in the end wall of the bobbin holder. The selection of the hole 117 determines the initial tension of the torsion spring 113.

Thus, the bobbin holder assembled on the hollow brake shaft is free to rotate on the stub shaft 100, retarded only by the action of a brake indicated generally by the numeral 118. This brake comprises two brake shoes 119 and 120 linked together as at 121 and embracing the flange 104 with the braking surfaces thereof riding on the edge of the flange.

The free end of the brake shoe 119 bears against a bracket 122 fixed to the side of the shuttle gear segment 10, being held in position thereon by a tension link 123 pivoted to the free end of shoe 120 and passing freely through a bifurcation in the end of shoe 119 and a hole in the bracket 122. A spring 124 on the link 123 confined between the bracket 122 and nuts 125 threaded on the link yieldingly draws the brake shoes together and maintains a braking action dependent upon the adjustment of the nuts 125.

The bobbin 9, which is essentially a spool having a large diameter bore closed at one end by a wall 127 except for a central hole 128 of a size to receive the end of stub shaft 100, snugly fits the bobbin holder 107. A pin 129 on the flange of the bobbin holder entering a hole 130 in the adjacent face of the bobbin secures the bobbin against turning with respect to its holder and a retainer 131 secures the bobbin on the holder. The retainer is a spring strip with a keyhole shaped opening 132, the large end of which accommodates the full diameter of the stub shaft 100 while the shank portion thereof receives the bottom of the annular groove 102. A shouldered screw 133 having its shouldered portion received in the shank of the keyhole slot is threaded into the end wall 127 of the bobbin to hold the retainer assembled therewith in a manner permitting the retainer to be slid across the face of the bobbin.

A slight bow in the retainer strip provides a spring tension to hold the same in any adjusted position and to draw the bobbin firmly against the bobbin holder. Two pins 134 projecting from the end wall 127 of the bobbin receive the strip therebetween and with the screw 133 guide the same for longitudinal movement. Shoulders 135 projecting from the sides of the retainer are engageable with these pins to define the bobbin releasing and applying position of the retainer at which the large end of its keyhole slot aligns with the hole 128.

The tension of the spring 113 takes up the lost motion in the lost motion driving connection between the bobbin holder and the brake shaft in the direction opposed to the direction of rotation incident to the application of unwinding tension on the strand material. Hence, the spring applies a retrieving torque on the bobbin holder and bobbin mounted thereon during the operation of the machine to take up the slack in the strand material and actually retrieve the same whenever the length thereof from the bobbin to its point of application onto the core is decreasing as noted in the diagrammatic illustration of Figures 15 and 16.

As indicated in Figure 10, the lost motion driving connection between the brake shaft 103 and the bobbin holder allows approximately 228° of spring restrained rotation of the bobbin without effecting rotation of the brake drum. Thus, through the coaction of the spring restrained lost motion driving connection, the retarding effect of the brake, and the spring produced retrieving torque on the bobbin, adequate winding tension is at all times maintained on the strand material regardless of the varying length thereof from the bobbin to its point of application onto the core.

It is to be observed that the strand material leaving the bobbin passes over guide pulleys 136 and 137 both of which are carried by the shuttle gear segment. The guide pulley 136 is mounted on a fixed stub shaft, but the pulley 137 is mounted on an arm 138 swingingly adjustable about its attachment to the shuttle gear segment. This adjustment enables the final guide for the strand material to be located as close to the point of application as the cross-sectional configuration of the core will permit.

Figure 15:
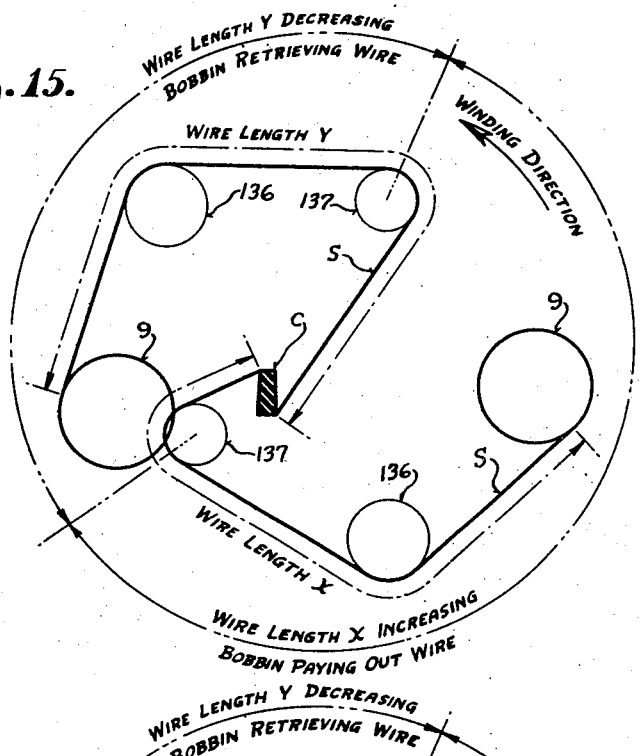
Figures 15 and 16 are diagrammatic views to illustrate the manner in which the length of the strand material varies as the bobbin travels around its orbit and showing the purpose of the mechanism for retrieving the strand material during part of the cycle.
Figure 16:
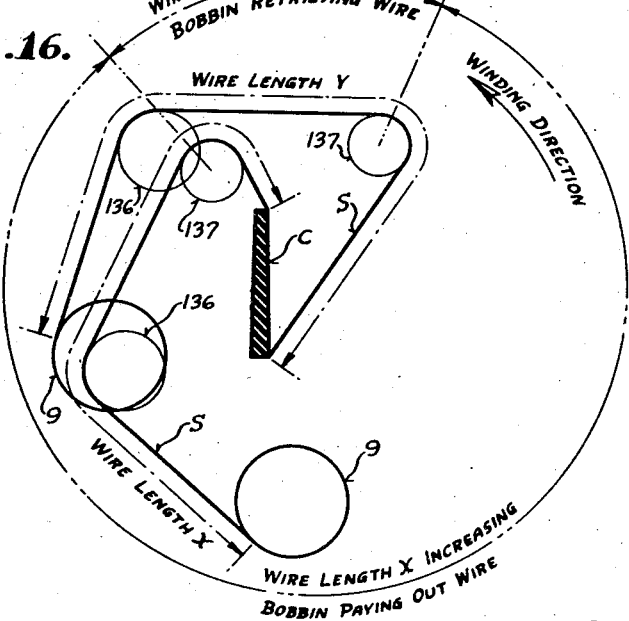

As will be clear from a consideration of Figures 15 and 16 the thickness and height of the core and its location with respect to the center of the orbit of the bobbin are factors which determine the requirements of the means employed to maintain adequate winding tension on the strand material.

In Figure 15, the relationship of these elements is such that for almost one-half the cycle of the bobbin the length of the strand material from the bobbin to its point of application onto the core indicated by the legend "Wire length Y" is decreasing. For the balance of the cycle the length of the strand material indicated as "Wire length X" is increasing. Thus, the degree of lost motion in the driving connection between the brake shaft and the bobbin holder is such that for at least 180° of the bobbin cycle the strand material may be rewound and for the balance of the cycle it is unwound from the bobbin.

With increase in the height of the core the time during which the bobbin must retrieve the strand material decreases as indicated in Figure 16, but at all times there is a constantly changing condition affecting the maintenance of winding tension on the strand material which, in the present invention, is successfully met by the brake retarding unwinding rotation of the bobbin and the spring maintaining a retrieving torque on the bobbin.

Mounted on the gear housing 12 is a counter 139 for counting cycles of revolution of the bobbin and consequently the number of coils being applied on a core. This counter is driven by a sprocket chain 140 trained over sprockets on the shaft of the counter and the shaft of an idler gear 141 carried by an arm 142 radially adjustable about the shaft 21. A gear 143 on the shaft 21 meshes with the idler gear 141 to complete the drive transmission to the counter, and to protect the operator a sheet metal guard housing 144 is preferably applied over the drive transmission to the counter.

A guard housing 145 is also placed over the speed reducers and drive mechanism as indicated by dot-dash lines on the drawings.

The counter incorporates a switch 146 adapted to be set for opening after a predetermined number of revolutions of the bobbin so as to enable automatically winding a predetermined number of coils onto a core. This counter switch and a similar limit switch 147, provided as a safety measure to protect the machine against damage by being left running without an operator in attendance, are connected in series in a control circuit 149 by which the operation of the drive motor 150 is controlled. The limit switch 147 is adapted to be opened by an arm 148 fixed to and rotated with the turntable of the indexing head.

As specifically illustrated in Figure 14, the motor is connected across the supply lines $L^1$, $L^2$ through a normally open solenoid controlled switch 151. Energization of the solenoid 152 controlling this switch is dependent upon closure of a main switch 153 to effect energization of the primary of a transformer 154 and the closure of a manual control switch 155 and the counter and limit switches heretofore mentioned connected in the control circuit 149. With all of these switches closed the solenoid 152 is energized to close its switch and start the motor.

Simultaneously with the closure of the switch 151, which, in operation, is generally by closure of the manual control switch 155, a solenoid opens a normally closed switch 157 and this switch is connected in a circuit 158 which includes the brake controlling solenoid 42. Thus, upon starting of the motor the brake controlling solenoid 42 is deenergized to release the brake, and conversely upon opening of any of the switches 146, 147 or 155 to stop the motor the solenoid 42 is reenergized to apply the brake and immediately stop the machine.

While Figure 14 shows the brake applied directly to the motor shaft, in practice and as illustrated in the drawings, it is preferable to have the brake on the power input shaft of the machine.

The silent ratchet clutch 28 is so designed that when the clutch is engaged it provides for the transmission of power to the machine and at the same time permits manual forward motion of the machine without necessitating declutching, but when declutched, unhindered manual manipulation of the machine in either direction is possible.

As already noted, the driving element of the clutch is fixed to the output shaft 30 of the speed reducer 31. This driving element 29 comprises a circular flange 159 having recesses 160 in the edge thereof to form substantially triangular ratchet pockets. The flange 159 is closely fitted within a cylindrical cavity 161 in the driven element of the clutch. Pins 162 loosely received in the pockets 160, where they are held by a retainer ring 163, are wedged between the surface of the cylindrical cavity 161 and the opposite long faces of the pockets 160 by springs 164 to establish a clutching connection between the driving and driven elements for power transmission in one direction. In that same direction the driven element of the clutch may, of course, be manually rotated with respect to the driving element permitting manual operation of the machine in a forward direction without declutching.

To declutch, all of the several pins 162 are positively held against being wedged into driving positions by pushing in a plurality of pointed pin members 165 fixed to a clutch control knob 166 and guided for longitudinal movement by holes 167 in a bonnet 168. The bonnet 168 is secured to the driven member by screws 169, being properly located by dowel pins 169'.

The position of the holes 167 with relation to the pins 162 is such that upon declutching actuation of the knob 166 all of the pins 162 are pushed laterally to their inactive non-driving positions. A spring detent 170 provides means for indicating the "clutch in" and "clutch out" positions of the knob 166.

*Operation*

Assuming that the main switch is closed, which is indicated by a pilot light, as shown in Figure 14, but that the manual control switch 155 is open, the drive motor for the machine is thus not in operation and the brake is applied on the power input shaft of the machine. Assuming also that a bobbin, which has previously had a supply of strand material wound thereon is in position on its holder, the operator then fastens a core C in the clamp 7 and secures the end of the strand material to the core by lacing the same through the holes 96 in the core and securing the extreme end to the side of the core by a piece of adhesive tape or the like if the strand material is fine, or by manually wrapping the same around the core a few times and similarly securing the extreme end if the strand material is heavier wire or the like.

In applying the core, the shuttle 10, which carries the bobbin, must be so positioned that its gap 11 aligns with the gap 13 of the housing 12 in which the shuttle is mounted. This permits the annular core to be interlinked with the orbit of the bobbin.

If the strand material is heavier than exceptionally fine wire the operator inserts a shim approximately the thickness of the strand material being used between the stationary jaw of the clamp and the inner surface of the core to make certain that the core will be properly centered over the indexing head which is necessary to have the coils applied to the core lie in exactly radial planes.

The operator then sets the counter to the desired number of turns to be applied and closes the control switch 155 whereupon the machine operates to automatically apply the desired amount of strand material to the core. The bobbin carrying the strand material is revolved around a segment of the core in position and at the same time the indexing head carrying the core keeps rotating the core to at all times present a fresh segment to the strand material being applied.

If the core has a stepped height, as shown in the drawings, the operator watches the winding action and opens the control switch 155 just before the transition or riser between two steps is reached. Then, with the clutch disengaged by pushing in the knob 168 the coils directly adjacent to the riser of the step are applied by manually turning the machine with one hand on the hand wheel 22, while with the other hand the operator manipulates a tool to insure proper transition from one step to the other. This accomplished, the power is again applied and all of the steps throughout one-half of the core are wound.

At the completion of the first half of the winding the core is released from the clamp and while the operator holds the partially wound core against movement the turntable of the indexing head is disengaged from its drive shaft by releasing the latch 82, swung around 180°, and reconnected to the drive shaft by allowing the latch to snap into the adjacent recess. The core is then again tightened in the clamp and the winding proceeds as before.

It is, of course, to be understood that while this machine is especially well adapted to the winding of stepped cores, cores of uniform height are even more efficiently wound with this machine for in this case the operator need only place the core in position, set the counter 139 to open its switch 146 when the required number of turns are applied, and start the machine as described.

From the foregoing description, taken in connection with the accompanying drawings, it will be readily apparent to those skilled in the art, that this invention provides a toroidal winding machine of unprecedented accuracy and one in which toroidal coils of uniform or non-uniform cross-section may be readily and economically wound and that by virtue of the novel manner of maintaining winding tension the coils wound on the machine of this invention have all turns thereof tight and properly spaced.

What I claim as my invention is:

1. In a winding machine of the character described: means for supporting and rotating an annular core upon which strand material is to be wound; a bobbin holding a supply of strand material; means for revolving the bobbin in a circular orbit intersecting the annular core and encircling a segment thereof, the bobbin rotating on its axis in one direction as strand material is unwound therefrom and applied to the core; brake means for retarding the unwinding rotation of the bobbin so as to maintain tension on the strand material as long as it is being unwound from the bobbin; and means for applying a retrieving torque on the bobbin to at all times maintain tension on the strand material and retrieve the same whenever the length thereof from the bobbin to the point of application of the strand material onto the core is decreasing.

2. In a winding machine of the character described: means for supporting and rotating an annular core upon which strand material is to be wound; a bobbin holding a supply of strand material; means for revolving the bobbin in a circular orbit encircling a segment of the core, the length of the strand material from the bobbin to its point of application onto the core varying as the bobbin moves along its orbit and the bobbin rotating on its axis in one direction as strand material is unwound therefrom and applied to the core; brake means for retarding the unwinding rotation of the bobbin so as to maintain tension on the strand material; and a torsion spring applying a retrieving torque on the bobbin and tending to rotate the same in the opposite direction to retrieve the strand material and maintain adequate winding tension whenever the length of the strand material from the bobbin to its point of application onto the core is decreasing.

3. In a winding machine of the character described: a planetary bobbin holding a supply of strand material; means for positively bodily revolving the bobbin in a fixed circular orbit; means for supporting and rotating an annular core upon which strand material from the bobbin is to be wound, said means supporting the annular core in a position intersecting the orbit of the bobbin with a segment of the core circumscribed by the orbit of the bobbin and with its position with relation to the center of the orbit dependent upon the size of the core so that the length of the strand material from the bobbin to its point of application onto the core varies with cores of different diameters and cross-sectional sizes and increases and decreases as the bobbin moves along its orbit; and means for maintaining adequate winding tension comprising means for applying a retrieving torque on the bobbin tending to turn the bobbin on its axis of rotation as the bobbin revolves bodily in said orbit to retrieve strand material whenever the length thereof from the bobbin to its point of application onto the core is decreasing.

4. In a winding machine of the character described: a planetary bobbin holding a supply of strand material; means for positively bodily revolving the bobbin in a fixed circular orbit; means for supporting a core upon which strand material from the bobbin is to be wound, said means supporting the core in a position at which a portion of the core lies within the orbit of the bobbin with the position thereof with relation to the center of the orbit dependent upon the size of the core so that the length of the strand material from the bobbin to its point of application onto the core varies with changes in the size of the core and increases and decreases as the bobbin moves along its orbit; and means for maintaining adequate winding tension on the strand material including a spring acting on and tending to turn the bobbin on its axis of rotation as the bobbin revolves bodily in said orbit so as to take up slack in the strand material whenever the length thereof from the bobbin to the point of its application onto the core is decreasing.

5. In a winding machine: a bobbin holding a supply of strand material; a shuttle mounted to rotate about a fixed axis for carrying the bobbin around a core upon which strand material from the bobbin is wound as the bobbin travels along its orbit; and means mounting the bobbin on the shuttle in a manner providing for controlled unwinding of strand material therefrom and retrieving of strand material thereon comprising, a brake shaft rotatably mounted on the shuttle, a brake acting on said shaft to retard rotation thereof, a bobbin holder, means detachably securing the bobbin to said holder, and means providing a spring restrained lost motion driving connection between the bobbin holder and the brake shaft whereby unwinding tension on the strand material takes up the lost motion in said connection against the tension of the spring to turn the brake shaft while the spring is effective to turn the bobbin in a retrieving direction.

6. In a toroidal winding machine having a shuttle constrained to revolve around a segment of a core supported in the machine to have strand material wound thereon: a bobbin holding a supply of strand material; and means mounting the bobbin on the shuttle in a manner providing for controlled unwinding of strand material therefrom and the retrieving of strand material thereon comprising, a shaft fixed to the shuttle and extending laterally therefrom, a tubular brake shaft journaled on said fixed shaft, a brake acting on said tubular brake shaft to retard rotation thereof, a bobbin holder rotatable on said tubular brake shaft, a lost motion driving connection between the tubular brake shaft and the bobbin holder, a torsion spring for taking up the lost motion in said driving connection in one direction, and means for readily detachably securing the bobbin to the bobbin holder, the direction of the torque applied by said spring being such that unwinding tension on the strand material acts against the tension of the spring to take up the lost motion in the driving connection and maintain tension on the strand material through brake action so that whenever the tension on the strand material is released said spring is effective to maintain adequate winding tension and retrieve strand material back onto the bobbin when necessary.

7. In a toroidal winding machine having a shuttle constrained to revolve around a segment of a core supported in the machine to have strand material wound thereon: a bobbin holding a supply of strand material; and means mounting the bobbin on the shuttle in a manner providing for controlled unwinding of strand material therefrom and the retrieving of strand material thereon comprising, a stub shaft fixed to and projecting from the side of the shuttle, a tubular brake shaft rotatable on said stub shaft, a brake acting on the brake shaft to retard rotation thereof, a cup-shaped bobbin holder telescoped over the tubular brake shaft, an abutment on the stub shaft holding the bobbin holder in position, a lost motion driving connection between the tubular brake shaft and the bobbin holder, a torsion spring within the cup-shaped bobbin holder having one end anchored thereto and its other end anchored to the tubular brake shaft tending at all times to take up the lost motion in said driving connection in one direction, and means for readily detachably securing a bobbin to the bobbin holder, the direction of the torque applied by the spring being such that unwinding tension on the strand material acts against the spring tension to take up the lost motion in the driving connection in the opposite direction and thus utilize brake action for maintaining tension on the strand material so that whenever the tension on the strand material is released said spring is effective to maintain adequate winding tension and retrieve strand material back onto the bobbin when necessary.

8. In a toroidal winding machine having a shuttle constrained to revolve around a segment of a core supported in the machine to have strand material wound thereon: a bobbin holding a supply of strand material; and means mounting the bobbin on the shuttle in a manner providing for controlled unwinding of strand material therefrom and the retrieving of strand material thereon comprising, a stub shaft mounted on and projecting from the side of the shuttle, the end of the stub shaft having an annular groove, a hollow brake shaft rotatable on the stub shaft, a brake acting on said hollow brake shaft to retard rotation thereof, a bobbin holder mounted on the hollow brake shaft, a lost motion driving connection between the hollow brake shaft and the bobbin holder, a spring tending at all times to yieldingly take up the lost motion in said driving connection in one direction, the bobbin being freely slidably engageable with the bobbin holder, means for preventing relative rotation between the bobbin holder and the bobbin when the bobbin is in position, and a bobbin retainer slidable across the front of the bobbin and having a keyhole opening to permit passage of the end of the stub shaft therethrough in the disengaging position of the bobbin retainer, the edges of the keyhole shank being engageable in the annular groove of the stub shaft upon sliding of the bobbin retainer to its bobbin securing position.

9. In a toroidal winding machine: a support for a core upon which strand material is to be wound; a shuttle constrained to rotary motion around a segment of a core held by the support; a bobbin holding a supply of strand material; and means mounting the bobbin on the shuttle in a manner providing for the unwinding of strand material therefrom and the retrieving of strand material thereon comprising, a stub shaft mounted on and projecting from the side of the shuttle, the end of the stub shaft having an annular groove, a hollow brake shaft rotatable on the stub shaft, a brake acting on said hollow brake shaft to retard rotation thereof, a bobbin holder mounted on the hollow brake shaft, a lost motion driving connection between the hollow brake shaft and the bobbin holder, a spring tending at all times to yieldingly take up the lost motion in said driving connection in one direction, the bobbin being freely slidably engageable on the bobbin holder, means for preventing relative rotation between the bobbin holder and the bobbin when the bobbin is in position, and a spring strip slidable across the front of the bobbin, said strip having a keyhole opening to permit passage of the end of the stub shaft therethrough in the disengaging position of the strip, the shank of the keyhole opening being engageable in the annular groove of the stub shaft upon sliding of the spring strip to its bobbin securing position, and said spring strip being bowed so as to draw the bobbin firmly into place as the strip is slid toward its bobbin securing position.

10. In a toroidal winding machine having a shuttle constrained to revolve around a segment of a core supported in the machine to have strand material wound thereon: a bobbin holding a supply of strand material; and means mounting the bobbin on the shuttle in a manner providing for controlled unwinding of strand material therefrom and the retrieving of strand material thereon comprising, a stub shaft mounted on and projecting from the side of the shuttle, the end of the stub shaft having an annular groove, a hollow brake shaft rotatable on the stub shaft, a brake acting on said hollow brake shaft to retard rotation thereof, a bobbin holder mounted on the hollow brake shaft, a lost motion driving connection between the hollow brake shaft and the bobbin holder, a spring tending at all times to yieldingly take up the lost motion in said driving connection in one direction, the bobbin being freely engageable with the bobbin holder, means for preventing relative rotation between the bobbin holder and the bobbin when the bobbin is in position, a bobbin retainer slidable across the front of the bobbin and having a keyhole opening to permit passage of the end of the stub shaft therethrough in the disengaging position of the bobbin retainer, the edges of the keyhole shank being engageable in the annular groove of the stub shaft upon sliding of the bobbin retainer to its bobbin securing position, a shouldered screw received in the shank of the keyhole opening and secured in the end of the bobbin for holding the bobbin retainer assembled with the bobbin, spaced pins projecting from the end of the bobbin between which the retainer is slidable, and shoulders on the retainer engageable with the pins for defining the bobbin releasing position of the retainer.

11. In a toroidal winding machine: a support for a core upon which strand material is to be wound; a shuttle constrained to rotary motion around a segment of a core held by the support; a bobbin holding a supply of strand material; and means mounting the bobbin on the shuttle in a manner providing for the unwinding of strand material therefrom and the retrieving of strand material onto the bobbin comprising, a stub shaft fixed to and projecting from the side of the shuttle, a hollow brake shaft rotatable on the stub shaft, a flange on the hollow brake shaft providing a brake drum, a brake engaging said flange to retard rotation of the hollow brake shaft, a cup-shaped bobbin holder telescoped over the hollow brake shaft, an abutment on the stub shaft engaging the bobbin holder to secure the same in position, a flange on the inner open end of the bobbin holder overlying the flange on the hollow brake shaft, said flange on the bobbin holder having a segment thereof cut away to define spaced substantially radial shoulders, a pin on the flange of the hollow brake shaft in position to collide with said shoulders to provide a lost motion driving connection between the hollow brake shaft and the bobbin holder, a torsion spring within the bobbin holder having one end thereof anchored to the brake shaft and its other end anchored to the bobbin holder for yieldingly taking up the lost motion in said driving connection in one direction, and means for readily detachably securing a bobbin to the bobbin holder.

12. In a toroidal winding machine of the character described: clamping jaws to grip an annular core and hold the same in position to have strand material wound thereon; a turntable on which said clamping jaws are mounted in such relation that the center of the annular core coincides with the axis of the turntable; a driving shaft for and coaxial with the turntable through which rotation is imparted to the turntable to progressively present a new part of the core to the winding mechanism of the machine; and a readily releasable connection between the turntable and its driving shaft adapted to secure the turntable to the driving shaft in either of a plurality of fixed locations whereby 360° of rotation may be imparted to the core by releasing the core from the grip of the clamping jaws after a predetermined degree of rotation, disengaging the turntable from its driving shaft and revolving the same with relation to the core to a new position.

13. In a toroidal winding machine having mechanism for carrying a bobbin along a defined circular orbit to wind strand material onto an annular core intersecting the orbit of the bobbin with a segment of the core circumscribed by the orbit, means for holding the core in position and advancing the same rotarily, said means comprising: a rotatable drive shaft having a circular head at the upper end thereof; means constraining the shaft to rotary motion on a fixed axis; a turntable seated on the circular head of the shaft to rotate thereon and therewith; a pair of clamping jaws for detachably clamping a segment of a core therebetween, said clamping jaws being mounted on the turntable in such a position as to hold the core concentrically to the axis of the turntable; and a releasable latch for securing the turntable to the circular head of the drive shaft in any one of a number of fixed positions.

14. In a toroidal winding machine: a shuttle constrained to rotary motion; a bobbin mounted on the shuttle to be carried thereby in a circular orbit for winding strand material from the bobbin onto an annular core interlinked with the shuttle; a drive shaft constrained to rotary motion on an axis at right angles to the axis of the shuttle; a pair of clamping jaws; means connecting said jaws with the drive shaft so that the jaws rotate therewith, said clamping jaws being adapted to clamp a segment of a core therebetween to hold the core concentric to the axis of the drive shaft; a source of power; and transmission gearing tying the drive shaft and the shuttle to the source of power so that said shuttle and drive shaft revolve in unison at a predetermined speed ratio.

15. In a toroidal winding machine: a shuttle constrained to rotary motion; a bobbin mounted on the shuttle to be carried thereby in a circular orbit for winding strand material from the bobbin onto an annular core interlinked with the shuttle; a drive shaft constrained to rotary motion on an axis at right angles to the axis of the shuttle; a pair of clamping jaws; means connecting said jaws with the drive shaft so that the jaws rotate therewith, said clamping jaws being adapted to clamp a segment of a core therebetween and hold the core concentric to the axis of the drive shaft; a source of power; transmission gearing tying the drive shaft and the shuttle to the source of power so that said shuttle and drive shaft revolve in unison at a predetermined speed ratio; and means acting on the drive shaft to eliminate rotational vibration and backlash and insure the retention of the predetermined speed ratio between the rotation of the annular core and the shuttle.

16. In a toroidal winding machine: means for supporting an annular core upon which strand material is to be wound and for rotating the core on its axis; a shuttle traveling in a defined orbit encircling a segment of a core in position; mechanism on said shuttle for applying strand material onto the core, a power takeoff shaft; a drive shaft for the core support; a drive shaft for the shuttle; a gear transmission connecting both of said drive shafts with the power takeoff shaft so as to provide a predetermined speed ratio in the motion of said core support and shuttle; a power drive shaft; a motion transmitting connection between said power drive shaft and the power takeoff shaft; and a clutch included in said motion transmitting connection for quickly disconnecting the power takeoff shaft from the power drive shaft and permit unhindered manual rotation of the power takeoff shaft.

17. In a winding machine of the character described: means for supporting a core upon which strand material is to be wound; a bobbin holding a supply of strand material; means for moving the bobbin in a defined orbit encircling a part of the core, the length of the strand material from the bobbin to its point of application onto the core varying as the bobbin moves along its orbit, and the bobbin rotating on its axis in one direction as strand material is unwound therefrom and applied to the core; and means for maintaining adequate tension on the strand material including yieldable means applying a retrieving torque on the bobbin and tending to rotate the same in the opposite direction to retrieve the strand material.

18. In a winding machine of the character described: a bobbin holding a supply of strand material; means mounting the bobbin for bodily movement in a defined orbit and for rotation on an axis which travels along said orbit; means for supporting a core upon which strand material from the bobbin is to be wound with a part of the core at all times within the orbit of the bobbin, the position of said core part with relation to the center of the orbit being dependent upon the size of the core so that the length of the strand material from the bobbin to its point of application onto the core varies with changes in the size of the core and increases and decreases as the bobbin moves along its orbit; and means for maintaining adequate winding tension on the strand material including means for applying a retrieving torque on the bobbin to retreive strand material whenever the length thereof from the bobbin to its point of application onto the core is decreasing.

19. In a toroidal winding machine having mechanism for carrying a bobbin along a defined orbit to wind strand material onto an annular core intersecting the orbit of the bobbin with a segment of the core circumscribed by the orbit: means for holding the core in position and advancing the same rotarily, comprising, a rotatable drive member, a turntable member coaxial with said rotatable drive member to rotate with and with respect to said drive member, a pair of clamping jaws for detachably clamping a segment of a core therebetween, said clamping jaws being mounted on the turntable member in such a position as to hold the core concentrically to the axis of the turntable member, and a latch carried by one of said members and releasably engageable with the other member for securing said members together in any one of a number of defined angularly related positions.

20. In a winding machine: means for supporting a core upon which strand material is to be wound; a bobbin holding a supply of strand material; means for revolving the bobbin at constant speed in an orbit encircling a part of the core, said means including a bobbin supporting shaft, and means for detachably and rotatably holding the bobbin on the shaft; and means for maintaining adequate tension on the strand material notwithstanding variations in the strand length between the bobbin and the point of application of the strand material to the core, said means comprising a brake for retarding unwinding rotation of the bobbin, a lost motion torque transmitting connection between the bobbin and said brake whereby the bobbin is allowed some rotation unrestrained by the brake, and spring means at all times applying rewinding torque upon the bobbin.

21. In a winding machine: a bobbin holding a supply of strand material; a shuttle mounted to rotate about a fixed axis for bodily carrying the bobbin around a core upon which strand material from the bobbin is wound as the bobbin travels along its orbit; means mounting the bobbin in a circumferentially fixed position on the shuttle with the entire bobbin lying radially to one side of the axis of the shuttle and rotatable on its own axis; a friction brake for restraining unwinding of the bobbin; a lost motion connection between the bobbin and the friction brake allowing some rotation of the bobbin unrestrained by the friction brake; and spring means reacting between the bobbin and a part fixed with respect to the shuttle at all times applying rewinding torque upon the bobbin so that said spring means coacts with the friction brake and the lost motion connection to control unwinding of the strand material from the bobbin and retrieves strand material onto the bobbin when the strand length between the bobbin and the point of application of the strand material to the core decreases.

JOSEPH G. VEATCH.

REFERENCES CITED

The following references are of record in the file of this patent:

UNITED STATES PATENTS

| Number | Name | Date |
|---|---|---|
| 802,359 | Nickel | Oct. 17, 1915 |
| 1,246,832 | Ahrbin | Nov. 20, 1917 |
| 1,679,804 | Bisel et al. | Aug. 7, 1928 |
| 1,953,725 | Ruesch | Apr. 3, 1934 |